United States Patent Office 3,600,449
Patented Aug. 17, 1971

3,600,449
PREPARATION OF PRIMARY ALCOHOLS
Robert A. Dombro, Chicago, Ill., assignor to Universal Oil Products Company, Des Plaines, Ill.
No Drawing. Filed June 20, 1968, Ser. No. 738,419
The portion of the term of the patent subsequent to Dec. 24, 1985, has been disclaimed
Int. Cl. C07c *31/02, 31/16, 35/02*
U.S. Cl. 260—638R
8 Claims

ABSTRACT OF THE DISCLOSURE

Preparation of a primary alcohol by heating an ester of a terminal olefin and a carbothiolic acid in solution and at about 100°–300° C. with a cleaving agent, such as alkali metal or alkaline earth metal hydroxides or alkoxides, and a mild oxidizing agent, such as a sulfoxide.

BACKGROUND OF THE INVENTION

This invention relates to a novel process for the preparation of primary alcohols, particularly the $C_8+$ alcohols extensively employed as solvents in medicinal and cosmetic preparations, perfume manufacture, as extractants and solvents for materials in lacquers and varnishes, as alkylating agents in the preparation of synthetic detergents, and as intermediates in organic synthesis for example, in the manufacture of plasticizers for synthetic resins.

The reaction mixture resulting from the direct oxidation of hydrocarbons utilizing atmospheric oxygen invariably comprises a mixture of first, second and third stage oxidation products, e.g., alcohols, ketones and aldehydes, carboxylic acids, and the like. In those cases where it has been possible to inhibit the oxidation past the first stage to give principally an alcohol product, the alcohol product comprises a mixture of secondary alcohols, the extent of the mixture depending upon the number of carbon atoms in the alcohol chain. In many instances it is desirable not only to produce alcohols to the substantial exclusion of other oxidation products but also to produce primary alcohols. For example, it is generally considered that primary alcohols when utilized in the manufacture of plasticizers give a product of greater thermal and oxidative stability. It is therefore an object of this invention to present a novel process for the preparation of primary alcohols to the substantial exclusion of higher oxidation products.

SUMMARY OF THE INVENTION

In one of its broad aspects the present invention embodies a process for preparing a primary alcohol which comprises heating an ester of a terminal olefin and a carbothiolic acid in solution with a cleaving agent selected from the group consisting of the alkali metal and alkaline earth metal hydroxides and alkoxides at a temperature of from about 100° C. to about 300° C. and in contact with an oxidant which is a mild oxidizing agent at reaction conditions.

Other objects and embodiments of this invention will become apparent with reference to the following detailed specification.

Pursuant to the process of this invention, an ester of a terminal olefin and a carbothiolic acid is heated in solution with a cleaving agent and in contact with an oxidant which is a mild oxidizing agent at reaction conditions. The aforesaid ester is the reaction product of a carbothiolic acid and a terminal olefin, i.e., containing olefinic unsaturation at a terminal carbon atom, and represented by the general formula

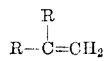

wherein each R is independently selected from the group consisting of alkyl, cycloalkyl, aryl, or hydrogen. Olefin starting materials thus include ethylene, propene, 1-butene, 2-methylpropene, 1-pentene, 2-methyl-1-butene, 3-methyl-1-butene, 1-hexene, 2-methyl-1-pentene, 3-methyl-1-pentene, 1-heptene, 1-octene, 1-nonene, 1-decene, 1-undecene, 1-dodecene, and the like. The olefin starting material determines the primary alcohol product and is selected accordingly. Other olefin starting materials which can be utilized include arylalkenes such as styrene, and also cycloalkylalkenes such as vinylcyclohexane.

Carbothiolic acid is herein intended as definitive of thiol acids represented by the general formula

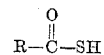

wherein R is alkyl, cycloalkyl, aryl or hydrogen. Carbothiolic acids thus include thiolformic acid, thiolacetic acid, thiolpropionic acid, etc., and also cyclohexanethiolcarboxylic acid, cyclopentanethiolcarboxylic aid, thiolbenzoic acid, and the like. While carbothiolic acids in general can be employed, as a practical matter it is preferred to utilize those most readily available and most readily separable from the reaction product in the form of the carboxylic acid derivative as hereinafter described.

The carbothiolic acid adds to the terminal olefin in anti-Markownikoff fashion to form an ester decomposable to a primary alcohol as hereinafter described. Reaction conditions applicable to the formation of said ester include a temperature of from about 25° C. to about 150° C., preferably from about 25° C. to about 125° C., and preferably under pressure of from about atmospheric to about 50 atmospheres. The anti-Markownikoff addition is effected in the presence of ultraviolet light or trace amounts of a peroxide, for example, acetyl peroxide, butyryl peroxide, lauroyl peroxide, benzoyl peroxide, diisopropylbenzoyl peroxide, etc., as well as inorganic peroxides.

The desired primary alcohol is formed on heating the ester thus prepared in solution with a cleaving agent and an oxidant at a temperature of from about 100° C. to about 300° C. Any material suitable as a cosolvent for the ester and the cleaving agent and substantially inert at reaction conditions can be utilized as a solvent. The lower alcohols, such as methanol, ethanol, etc. or aqueous solutions of these alcohols containing up to about 50% water have been found to be particularly useful to solubilize the ester together with the cleaving agent and in most cases the mild oxidizing agent. Suitable cleaving agents preferably include the various alkali metal and alkaline earth metal hydroxides, for example, sodium hydroxide, potassium hydroxide, lithium hydroxide, cesium hydroxide, rubidium hydroxide, beryllium hydroxide, magnesium hydroxide, calcium hydroxide, sodium hydroxide, barium hydroxide, etc. Suitable cleaving agents also include the alkali metal and alkaline earth metal alkoxides particularly the sodium and potassium alkoxides such as sodium methoxide, potassium methoxide, sodium ethoxide, potassium ethoxide, sodium propoxide, potassium propoxide, sodium isopropoxide, potassium isopropoxide, sodium butoxide, potassium butoxide, sodium isobutoxide, potassium isobutoxide, potassium t-butoxide, sodium t-butoxide, and the like. The cleaving agent is preferably utilized in at least a molar excess with respect to the ester being treated, preferably a molar excess of about 4:1 (alkali to ester) or more.

The oxidant utilized herein is one which is a mild oxidizing agent at reaction conditions, preferably including sulfoxides and the alkali metal and alkaline earth metal hypochlorites, although other mild oxidizing agents including air, potassium peroxy sulfate, copper sulfate, hydrogen peroxide, etc., are operable to obtain the desired products but not necessarily with the same or equivalent results. The preferred sulfoxides are represented by the general formula $$R-\overset{O}{\underset{}{S}}-R'$$

wherein R and R' may be the same or different hydrocarbyl groups such as alkyl, cycloalkyl, aryl, alkaryl or aralkyl. Sulfoxides thus include dialkyl sulfoxides such as dimethyl sulfoxide, diethyl sulfoxide, di-n-propyl sulfoxide, diisopropyl sulfoxide, di-n-butyl sulfoxide, diisobutyl sulfoxide, methylsulfinyl ethane, methylsulfinyl propane, etc., as well as cycloalkyl sulfoxides like tetramethylene sulfoxide, pentamethylene sulfoxide, and the like, and also aryl sulfoxides such as diphenyl sulfoxide, aralkyl sulfoxides like dibenzyl sulfoxide, alkaryl sulfoxides like di-p-tolyl sulfoxide, etc. The alkali metal and alkaline earth metal hypochlorites include sodium hypochlorite, potassium hypochlorite, lithium hypochlorite, cesium hypochlorite, rubidium hypochlorite, beryllium hypochlorite, magnesium hypochlorite, calcium hypochlorite, strontium hypochlorite, barium hypochlorite, etc., the sodium and potassium hypochlorites being preferred. The selected oxidizing agent is preferably employed in up to about equimolar amounts with respect to the ester reactant.

Recovery of the alcohol product can be by any conventional or otherwise convenient method. One suitable method comprises first distilling the solvent from the reaction mixture and acidifying the residual reaction mixture with dilute hydrochloric acid or other suitable acidifying agent. The acidified reaction mixture is thereafter extracted with ether, pentane, or other suitable material, and the extract distilled to yield the desired alcohol product. A carboxylic acid corresponding to the carbothiolic acid starting material is also recovered in the distillation process. It is thus apparent that the proper selection of a carbothiolic acid starting material will facilitate subsequent separation of the alcohol product by distillation methods.

The process of this invention is further illustrated by the following examples. It is not intended that said examples shall serve as an undue limitation on the generally broad scope of this invention as set out in the appended claims.

EXAMPLE I

Approximately 0.06 mole of n-dodecyl thiolacetate prepared by reacting about 0.07 mole of 1-dodecene with 0.07 mole of thioacetic acid at a temperature of about 100° C. under 30 atmospheres initial nitrogen pressure, 200 cc. of a methanolic solution of sodium hydroxide comprising 0.24 mole of sodium hydroxide, and 80 cc. of an aqueous sodium hypochlorite solution comprising 0.06 mole of sodium hypochlorite are prepared in solution in the glass lined autoclave and sealed therein under 30 atmospheres initial hydrogen pressure. The autoclave is heated at about 150–200° C. over a 5 hour period and thereafter cooled to room temperature and vented to the atmosphere. The reaction mixture is acidified with dilute hydrochloric acid and the n-dodecyl alcohol product is separated by fractional distillation.

EXAMPLE II

In the preparation of n-octyl alcohol, approximately 0.06 mole of the n-octyl thiolbenzoate prepared by reacting about 0.08 mole of 1-octene with 0.08 mole of thiolbenzoic acid at a temperature of about 100° C. under 30 atmospheres initial nitrogen pressure, 200 cc. of a methanolic solution of sodium hydroxide comprising about 0.24 mole of sodium hydroxide, and 0.06 mole of dimethyl sulfoxide are prepared in solution in the autoclave and sealed therein under 30 atmospheres initial nitrogen pressure. The autoclave is rotated and heated at about 150–200° C. over a 5 hour period. The autoclave is thereafter cooled and vented to the atmosphere. The reaction mixture is acidified and the n-octyl alcohol product recovered therefrom by distillation.

EXAMPLE III

About 0.06 mole of n-dodecyl thiolacetate, 0.24 mole of sodium ethoxide in 200 cc. of ethanol and 0.06 mole of dimethyl sulfoxide are prepared in solution in a glass lined rotatable autoclave and sealed therein under 30 atmospheres initial nitrogen pressure. The autoclave is rotated and heated at about 200° C. for a period of about 5 hours. The autoclave is cooled and depressured. The reaction mixture is acidified with dilute hydrochloric acid and the n-dodecyl alcohol product recovered from the acidified reaction mixture by fractional distillation.

EXAMPLE IV 0.2 mole of n-hexyl thiolacetate, 0.8 mole of sodium hydroxide and 0.4 mole of dimethyl sulfoxide in 162 grams of 95% ethanol was heated together at a temperature of 100–200° C. over a 5 hour period utilizing a glass lined rotating autoclave. The n-hexyl thiolacetate conversion was 100% and n-hexyl alcohol was recovered in 64 mole percent of theoretical yield. Little or no n-hexyl mercaptan was observed in the product mixture.

As evident from the foregoing examples, the cleaving agent is present in molar excess, and the oxidant is present in at least an equimolar amount, with respect to the ester.

I claim as my invention:

1. A process for preparing a primary alcohol which comprises heating an ester of a terminal olefin and a carbothiolic acid in solution with a molar excess of a cleaving agent selected from the group consisting of alkali metal and alkaline earth metal hydroxides and alkoxides at a temperature of about 100° to 300° C. and in contact with at least an equimolar amount of an oxidant selected from the group consisting of hydrocarbyl sulfoxides and the alkali metal and alkaline earth metal hypochlorites, said olefin having the formula $$R-\underset{\underset{R}{|}}{C}=CH_2$$

wherein each R is independently selected from the group consisting of alkyl, cycloalkyl, aryl and hydrogen; and said carbothiolic acid having the formula $$R-\overset{O}{\underset{}{\overset{\|}{C}}}-SH$$

wherein R is selected from the group consisting of alkyl, cycloalkyl, aryl and hydrogen.

2. The process of claim 1 further characterized in that the cleaving agent is an alkali metal hydroxide.

3. The process of claim 2 further characterized in that said cleaving agent is sodium hydroxide.

4. The process of claim 1 further characterized in that the oxidant is a dialkyl sulfoxide.

5. The process of claim 4 further characterized in that said dialkyl sulfoxide is dimethyl sulfoxide.

6. The process of claim 1 further characterized in that the oxidant is an alkali metal hypochlorite.

7. The process of claim 6 further characterized in that said hypochlorite is sodium hypochlorite.

8. The process of claim 5 further characterized in that said ester is n-hexyl thiolacetate and the primary alcohol is n-hexyl alcohol.

References Cited

UNITED STATES PATENTS

| | | | |
|---|---|---|---|
| 2,837,573 | 6/1958 | Mavity | 260—632 |
| 3,270,063 | 8/1966 | Fath et al. | 260—609D |
| 3,418,382 | 12/1968 | Dombro | 260—632 |
| 3,450,771 | 6/1969 | Dombro | 260—609A |

(Other references on following page)

FOREIGN PATENTS 757,148    9/1956    Great Britain _____ 260—632

OTHER REFERENCES

Reid, "Org. Chem. of Bivalents," vol. I (1958), pp. 112 and 128.

Reid, "Org. Chem. of Bivalents," vol III (1960), pp. 372, 375, 376.

Pillheimer et al., "J. Am. Chem. Soc.," vol. 52 (1930), pp. 4338–4344.

Kharash, "Org. S Cmpds.," vol. I (1961), pp. 173, 174.

Mack et al., "Test of Chem." (1949), p. 396.

HOWARD T. MARS, Primary Examiner

J. E. EVANS, Assistant Examiner

U.S. Cl. X.R.

204—158R; 260—514R, 515R, 540, 541, 542, 607R, 609A, 617, 618C, 643R